United States Patent [19]

Mukai et al.

[11] Patent Number: 4,836,356
[45] Date of Patent: Jun. 6, 1989

[54] CLEANER FOR CONVEYOR BELT

[75] Inventors: Hideki Mukai, Amagasaki; Yasuhiro Atari, Neyagawa, both of Japan

[73] Assignee: Nippon Tsusho Kabushiki Kaisha, Tokyo, Japan

[21] Appl. No.: 130,312

[22] Filed: Dec. 8, 1987

[30] Foreign Application Priority Data

May 7, 1987 [JP] Japan .................. 62-111388

[51] Int. Cl.$^4$ .............................. B65G 45/00
[52] U.S. Cl. .................... 198/499; 15/256.5
[58] Field of Search ............. 198/497, 499, 635–637; 15/256.5, 256.6

[56] References Cited

U.S. PATENT DOCUMENTS

| 3,841,470 | 10/1974 | Meguro . | |
|---|---|---|---|
| 3,865,232 | 2/1975 | Koenig et al. | 198/497 |
| 4,155,442 | 5/1979 | Gosling . | |
| 4,189,046 | 2/1980 | Ward . | |
| 4,402,394 | 9/1983 | Stoll | 198/499 |
| 4,664,250 | 5/1987 | Jakobs | 198/499 |
| 4,696,388 | 9/1987 | Stoll | 198/499 |

FOREIGN PATENT DOCUMENTS

| 29633 | 10/1977 | Australia . |
| 13053 | 3/1983 | Australia . |
| 3410046 | 9/1985 | Fed. Rep. of Germany . |
| 2153326 | 8/1985 | United Kingdom . |
| 2184084 | 6/1987 | United Kingdom . |

Primary Examiner—Joseph E. Valenza
Attorney, Agent, or Firm—Sixbey, Friedman, Leedom & Ferguson

[57] ABSTRACT

A cleaner for a conveyor belt includes a scraper arranged transversely of the belt on the return side of the same. The scraper is adjustably mounted for displacement about an axis extending in the transverse direction of the belt. The scraper has a scraping portion thereof which intends to come in close contact with the surface of the belt and is deflected from the common axis at a point midway between both side ends of the belt so as to form an arch shape.

11 Claims, 6 Drawing Sheets

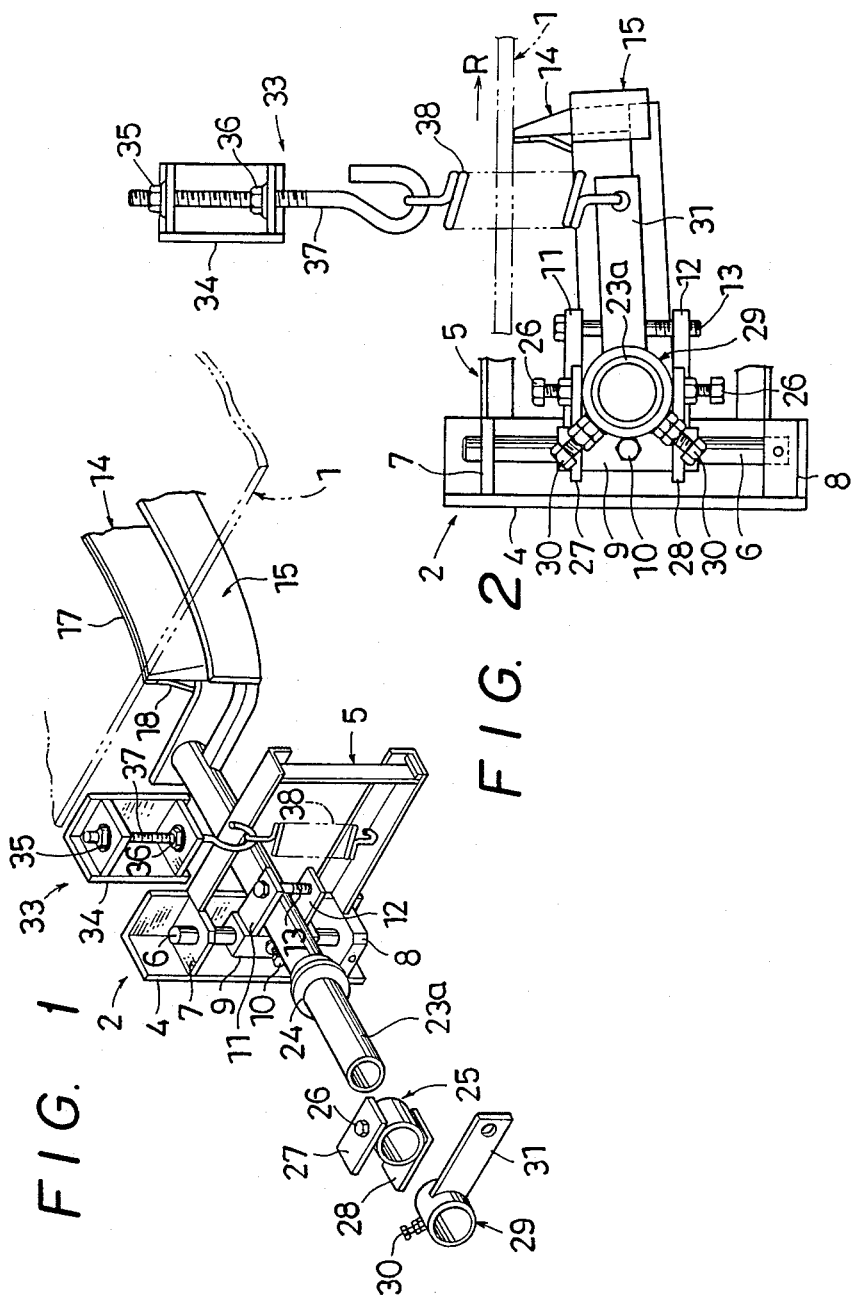

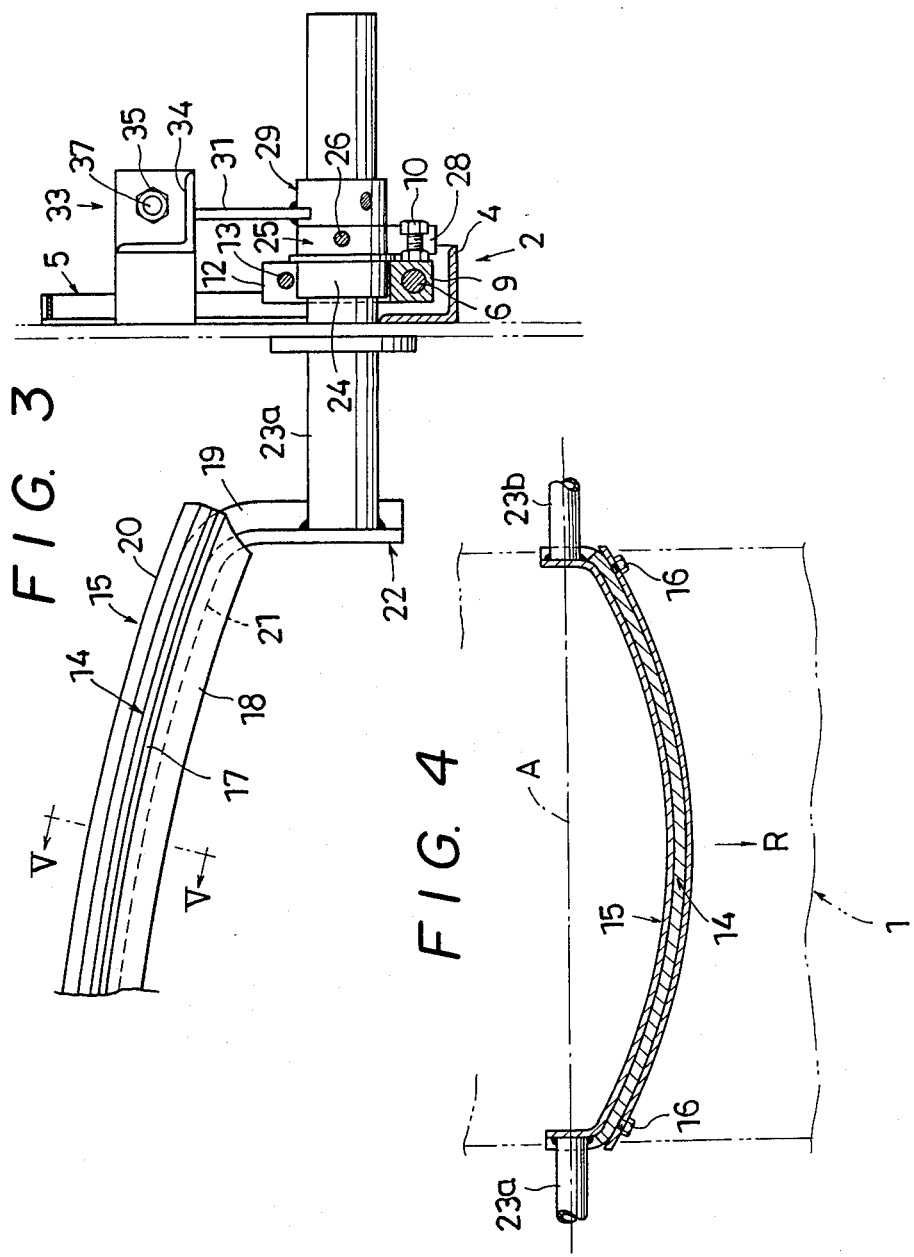

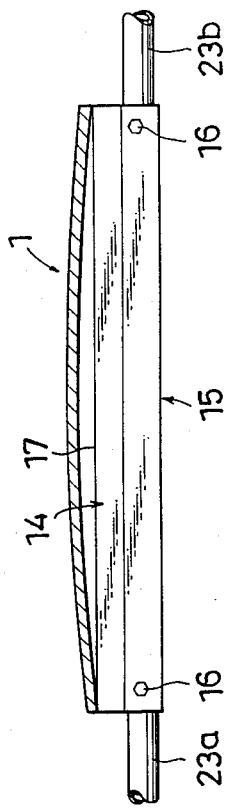
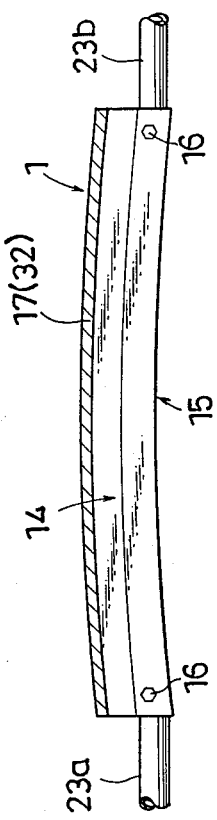
FIG. 6
FIG. 7
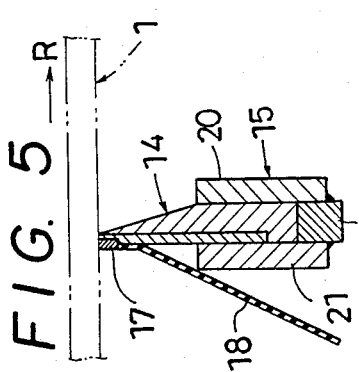
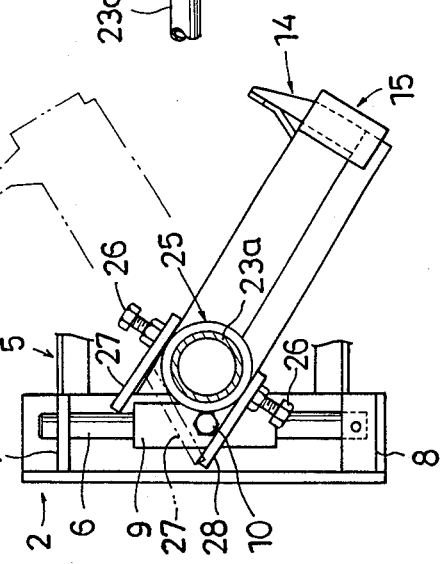
FIG. 5
FIG. 8

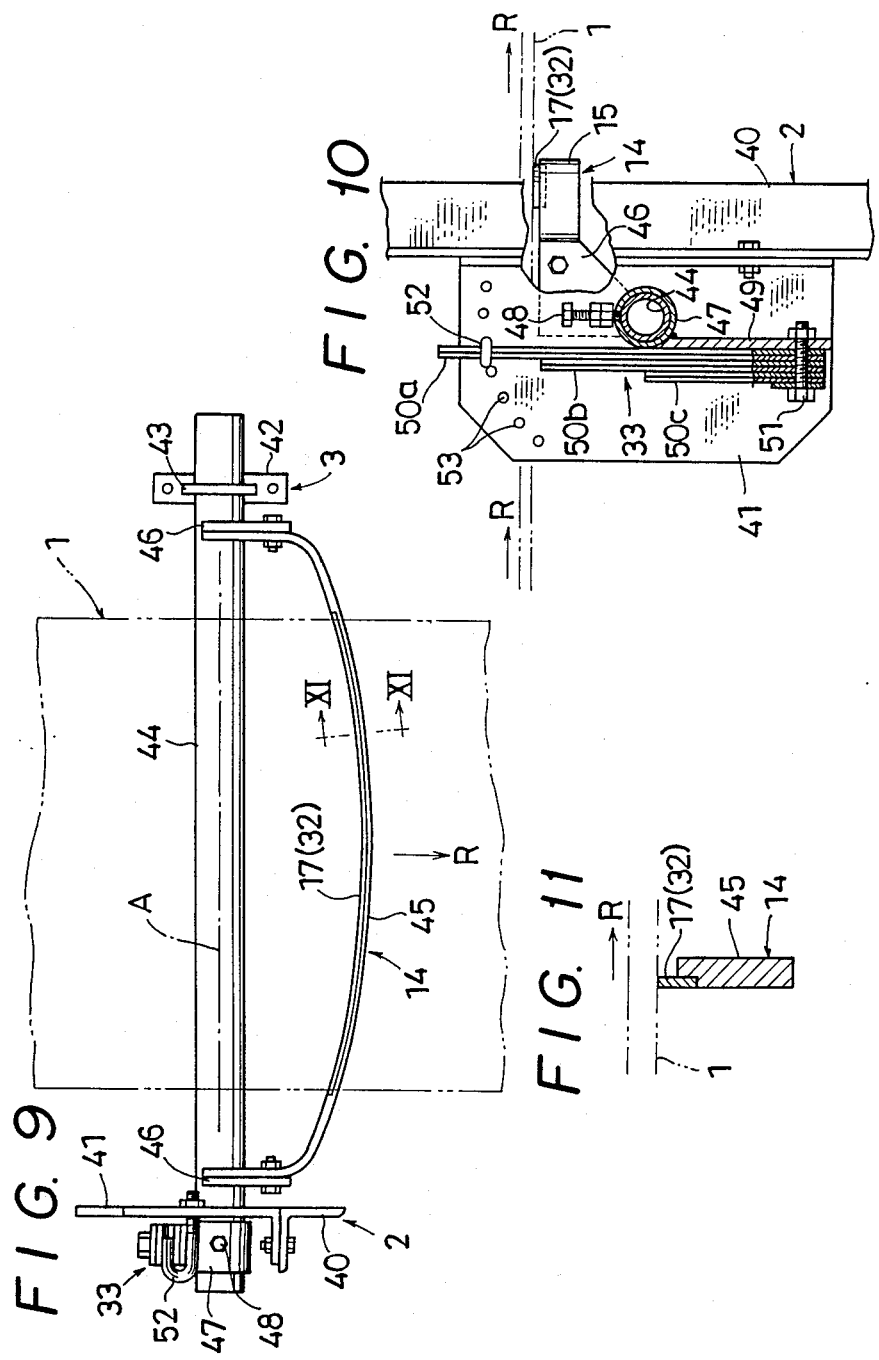

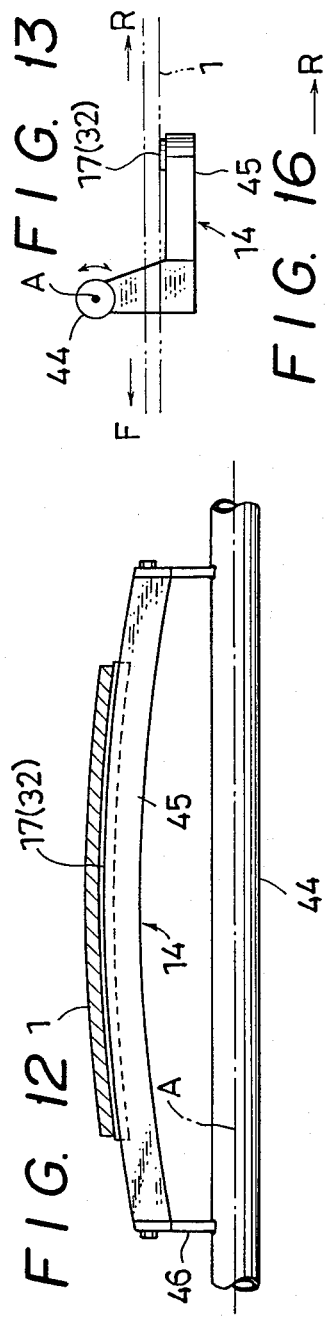

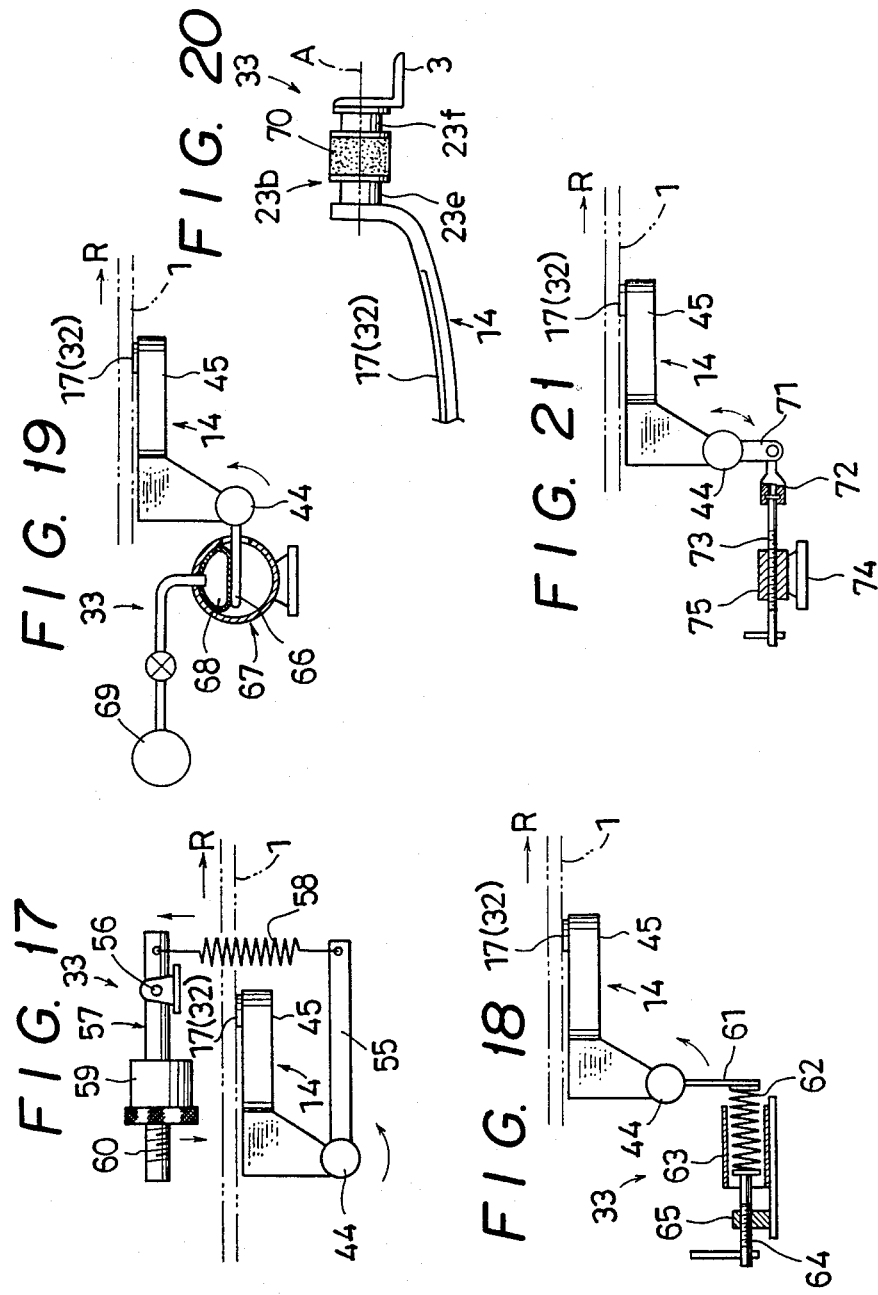

CLEANER FOR CONVEYOR BELT

BACKGROUND OF THE INVENTION

1. Field of Industrial Applications

The present invention relates to a cleaner for a conveyor belt by which the leavings of conveying material, e.g. coke, stuck on the surface of a conveyor belt are removed during the return movement of the belt.

2. Description of the Related Art

A prior art cleaner for a conveyor belt is disclosed in U.S. Pat. No. 3,841,470 wherein the conveyor belt includes a plurality of cleaner means disposed thereon in the transverse direction of the conveyor belt at the return side of the same. Each cleaner means has a scraping portion thereof which intends to come in contact with the belt surface, while all of which are arranged in linear relationship. More specifically, a scraper having, at uppermost end, a scraping portion thereof comprising of a tip member is yieldingly supported by a resilient member so that the scraping portion thereof becomes in contact with the belt surface under pressure by the resilience of the resilient member.

It is known that an endless conveyor belt, which is fitted for running in a circle between a drive pulley and an idler pulley, is supported on the forward side thereof by a plurality of guide rollers arranged at "trough" angles so as to be formed in a bow-like cross sectional shape in order to carry the transferring material in a stable manner. In other words, on the forward side of the running belt transferring the material thereon forward, the belt is supported so that the lengthwisely extending central region thereof can be arcuately deflected downward. The transferring materials are consecutively transferred generally on the central region of the belt, which will result in intensive wear on the central region of the belt surface rather than on both side regions of the same.

Because of its tendency to deflection (termed as generally a "trough" tendency), the belt is deflected upward at a point midway between the side ends thereof thus to form an arch shape in cross section on the return side of the belt where the belt runs backward opposite to the forward direction thereof after discharging the transferring material therefrom. In such an arrangement of the known cleaner, the scraping portions of the cleaner means arranged in linear relationship are prevented from meeting the belt surface when coming into close contact with the same. More specifically, there is a clearance between the scraping portions arranged linearly in said cleaner and the central region of the belt. The clearance becomes greater when the amount of wear on the central region of the belt surface is increased. Consequently, it will appear that the leavings of material on the central region of the belt surface cannot be positively scraped off by the scraping portions of the cleaner. Since the leavings of material adhered to the belt are generally greater in amount at the lengthwisely extending central region of the belt surface than the side regions of the same, some of the scraping portions disposed in the center get worn intensively in proportion to the amount of scraped material. This allows the clearance between the centrally mounted scraping portions and the belt surface to become gradually greater.

Each of the cleaner means has a scraper thereon which is supported yieldingly by the resilient member thus to be biased independently. When one of the scrapers is tilted laterally, a mass of the scraped material become trapped between the scraper and its adjacent scraper. This prevents the adjacent scraper from being biased independently, which will result in a stop of the returning movement of the scraping portion of the scraper from its biased position to its rest position for coming into contact with the belt surface.

SUMMARY OF THE INVENTION

The present invention is directed towards an improved cleaner for a conveyor belt in which the aforesaid problems may be solved.

According to the invention, the improved cleaner has a scraper thereon which extends in the transverse direction of the belt at the return side of the conveyor belt thus to remove the leavings of transferring material from the belt surface. The scraper is adjustably supported for rotary displacement about an axis extending transversely of the belt and has a scraping portion thereof which tends to come in close contact with the belt surface and is deflected a maximum from the axis at a point midway between both side ends of the belt to form an arch shape in cross section. Accordingly, when the scraper is turned upward about the axis to its standing position, the scraping portion thereof will arch its central region as lifted upward. This allows the scraping portion of the scraper to remain in close contact with the belt surface even if either the belt is a trough-shaped in cross section or the lengthwisely extending central region of the belt surface gets worn, whereby the problems will be solved.

In addition, according to the invention, the improved cleaner has a tensioning means by which the scraper is urged for rotary displacement to its standing position so that the scraping portion of the scraper can come into contact with the belt surface under pressure. This allows the scraper to turn automatically to its standing position, when its scraping portion gets worn, and thus, the scraping portion thereof will remain in close contact with the belt surface as being arcuately deflected upward.

BRIEF DESCRIPTION OF THE DRAWINGS

FIG. 1 is an exploded perspective view showing a support shaft of a scraper, a support supporting the support shaft, and a tensioning means for urging the scraper for rotaty displacement, which are arranged in a cleaner for a conveyor belt according to a first embodiment of the present invention.

FIG. 2 is a side view of the cleaner for a conveyor belt according to the embodiment.

FIG. 3 is a partial cross sectional plan view showing the support shaft mounted to the support on one side of the cleaner for a conveyor belt according to the embodiment.

FIG. 4 is a transverse cross sectional view of the scraper of the cleaner for a conveyor belt according to the embodiment.

FIG. 5 is an enlarged longitudinal cross sectional view taken on the line V—V of FIG. 3 showing the scraper of the cleaner for a conveyor belt according to the embodiment.

FIG. 6 is a front view showing the scraper of the cleaner for a conveyor belt according to the embodiment, which is not in its standing position.

FIG. 7 is a front view showing the scraper of the cleaner for a conveyor belt according to the embodiment, which is turned to rest in its standing position.

FIG. 8 is a partial cross sectional side view explaining that the rotary displacement of the support shaft is restricted by a stopper member in the clenaer for a conveyor belt according to the embodiment.

FIG. 9 is a plan view of a cleaner of a conveyor belt according to a second embodiment of the invention.

FIG. 10 is a partial cross sectional side view broken partially along the cleaner for a conveyor belt according to the second embodiment.

FIG. 11 is an enlarged longitudinal cross sectional view taken on the line XI—XI of FIG. 9 showing a scraper of the cleaner for a conveyor belt according to the embodiment.

FIG. 12 is a front view of a scraper of the cleaner for a conveyor belt according to the embodiment, which is turned to rest in its standing position.

FIG. 13 is a side view of a cleaner for a conveyor belt according to another embodiment of the present invention, showing the position of a rotational axis A of a scraper is changed.

FIG. 14 is a plan view of a cleaner for a conveyor belt according to a further embodiment of the invention, showing that two scrapers are arranged for double scraping action.

FIG. 15 is a plan view of a cleaner for a conveyor belt according to a further embodiment of the invention, showing a combination of the scraper of the present invention and a prior art cleaner for a conveyor belt.

FIG. 16 is an enlarged longitudinal cross sectional view of a scraper of a cleaner for a conveyor belt according to a further embodiment of the invention.

FIG. 17 is a side view of a tensioning means of a cleaner for a conveyor belt according to a further embodiment of the invention.

FIG. 18 is a side view of a tensioning means of a cleaner for a conveyor belt according to a further embodiment of the invention.

FIG. 19 is a side view of a tensioning means of a cleaner for a conveyor belt according to a further embodiment of the invention.

FIG. 20 is a plan view of a tensioning means of a cleaner for a conveyor belt according to a further embodiment of the invention.

FIG. 21 is a side view showing that no tensioning means are provided according to a further embodiment of the invention.

EMBODIMENT

Preferred embodiments of the present invention will be described in detail in conjunction with the accompanying drawings.

In each of the embodiments described hereinafter, a belt cleaner according to the invention is disposed in the transverse direction of and on the return side of a conveyor belt 1 and includes a scraper 14 for removing the leavings stuck on the surface of the belt. The scraper 14 is adjustably supported for rotary displacement about an axis A extending in the transverse direction of the belt and has a scraping portion 32 thereon which intends to be in contact with the surface of the belt and is outwardly deflected a maximum from the common axis A at a point midway between the side ends of the belt 1 so that the scraper 14 can be formed in a bow shape.

Throughout the drawings, a length of the conveyor belt 1 on the return side is shown in particular. The side referred to as a "return side" is opposite to the forward side of a running belt on which the amount of material is transferred forward. After unloading the transferring material, the belt fitted between a drive pulley and an idle pulley to run in a circle makes a full turn at the terminal end thereof where one of the pulleys is mounted in position, and then will run backward opposite to the forward direction throughout the return section. Therefore, the return side includes a running passage on the pulley after the turning point.

First Embodiment

According to a first embodiment shown in FIGS. 1 to 8, a pair of supports 2 and 3 are fixedly disposed on both right and left sides of a belt 1 at the return side of the same. Since the supports 2, 3 on their respective sides of the belt 1 are identical in construction and arranged in symmetrical relationship, one 2 of the supports is particularly shown in the drawings.

The support 2 comprises a pillar member 4 and a frame member 5 attached to the pillar 4, thus to form a square frame. The pillar 4 is fixedly mounted to a side wall of a hopper or a chute (not shown) disposed beneath the belt while the frame 5 is fitted in an opening of the side wall of the hopper or the chute. A vertically extending rod 6 is attached at both upper and lower ends thereof to the pillar 4 by means of two support members 7 and 8. A slide member 9 is slidably mounted to the middle section of the rod 6 so that it can be moved on the rod 6 and fixed at a specific position by a fixing means 10 such as a set bolt. A pair of holding arms 11 and 12 extend from a side of the slide member 9 in transverse directions of the frame 5. The arms 11, 12 are spaced and joined by a pin 13 at their distal ends. Referring to the drawings, the pin 13 is a socket head bolt which extends through the upper holding arm 11 and is screwed into the lower holding arm 12.

A scraper 14 is formed into an approximately bow shape, shown in FIG. 4, deflecting in the return running direction of the belt 1 represented by the arrow R and is detachably mounted to a holder 15 with the use of fixing means 16 such as set bolts. As shown in FIG. 5, a tip member 17 of wear-resistant material such as superhard metal, ceramics, or the like is mounted to the upper back surface of the scraper 24. A resilient sheet member 18, e.g. a rubber sheet, is attached at upper end to the back side of the scraper 14 beneath the tip 17 so as to hang downward to cover the back surface of the scraper 14. The holder 15 comprises a bottom member 19 and rail-like parallel holding walls 20 and 21 mounted upwardly to the bottom member 19 so as to form a channel member (FIG. 5). Both further ends of the bottom member 19 and rear wall 21 form elongated portions 22, 22 extending in the counter-return running direction of the belt so that the elongated portions 22, 22 can be be fixedly mounted to their respective support shafts 23a and 23b. The support shafts 23aa, 23b are coaxially disposed so that the scraper 14 can turn about the common axis A (FIG. 4)

The scraper 14 is arranged in place so that the belt 1 can run across the turning axis A while the support shafts 23aa, 23b are held by the supports 2 and 3 respectively. When the scraper 14, which is shaped in such a manner that the deflection from the axis A is a maximum at a midway between the side ends of the belt 1, is turned upward by rotating the support shafts 23, 23b about the axis A from its rest position shown in FIG. 6 to its working position shown in FIG. 7, the top end of the tip member 17 on the scraper 14 will arch its central region in the shape of a bow thus to define a scraping section 32 of the same which is to be in contact with the concave surface of the belt 1.

The support shaft 23a is mounted to the support 2 so as to extend through the frame 5 of the support 2 and to be held between the holding arms 11 and 12. A bearing member 24 of synthetic resin such as nylon is fitted onto the support shaft 23a and thus, can be fixedly gripped by the holding arms 11 and 12 with the pin 13 being tightened. In this arrangement, the support shaft 23a can rotate in the bearing 24. A stopper member 25 is fitted at the outer side of the bearing 24 onto the support shaft 23a by a fixing means 26 such as a set bolt. The stopper 25 has a top and bottom a pair of stopper strips 27, 28 such that the upper and lower stopper strips 27, 28 are located on the upper and lower sides of the fixing means 10 of the slide member 9 respectively. Accordingly, during the rotary displacement of the support shaft 23aa, the upper and lower stopper strips 27, 28 will respectively come into contact with the fixing means 10 thus to restrict the movement of the support shaft 23aa, as shown in FIG. 8. Additionally, an actuator 29 is fitted behind the stopper 25 onto the support shaft 23a by a fixing means 30 such as a set bolt. The actuator 29 has an actuator arm 31 which extends in a direction across the frame 5 and is linked to a tensioning means described herein below.

As not shown, the support shaft 23b on the opposite side is supportedly attached to the support 3 in an equal manner.

A tensioning means 33 located above the actuator arm 31 is mounted to the side wall of the chute or the hopper. The tensioning means 33 comprises a fixed member 34 secured to the side wall, e.g. the chute side wall, an adjusting member 37 including a hook bolt threaded for forward and backward movement into the fixed member 34 with the use of a couple of nuts 35 and 36, and an extension spring 38 connected to the adjusting member 37. The extension spring 38 is linked at the lowermost end thereof to the actuator arm 31. Accordingly, when the adjusting member 37 is lifted upward by rotating the nuts 35, 36, the actuator arm 31 moves upward as a tension on the spring 38 is increased. This allows the support shafts 23a and 23b to rotate in such a direction that the scraper 14 is raised to stand with its scraper portion 32 touching the back surface of the belt 1 under pressure, as shown in FIG. 7.

Second Embodiment

FIGS. 9 to 12 show a second embodiment of the present invention.

A pair of support members 2 and 3 are fixedly disposed on both sides of a belt at the return side of the belt. The support 2 comprises a supporting post 40 standing on the ground or mounted to a fitment (not shown) such as a frame of the conveyor, a chute, or the like, and a supporting plate 41 attached to the supporting post 40. On the opposite side, the support 3 comprises a supporting base 42 mounted fixedly to a fitment such as a frame of the conveyor, a chute, or the like, and a supporting plate 43 attached to the supporting base 42. A tubular bar 44 is rotatably mounted at both ends to a pair of the supporting plates 41, 43 of their respective supports 2, 3. The supporting plates 41 and 43 act as bearings of the bar 44 while the rotational axis A of the bar 44 transversely extends across the belt 1. The bar 44 has a scraper 14 thereon which is deflected in the return running direction R of the belt 1 thus to form an approximately bow shape and includes a holder 45 and a tip blade 17 attached to the holder 45, as shown in FIG. 9. The tip blade 17 of wear-resistant material such as superhard metal, ceramics, or the like is welded or attached by means of screws to the upper inside surface of the curved holder 45, as shown in FIG. 11. The holder 45 is detachably mounted at both ends to a pair of brackets 46, 46 mounted in upright relationship to the circumferential periphery of the bar 44. As being deflected a maximum from the axis A at the midway between the sides of the belt 1, the holder 45 with the tip blade 17 arches its center region raised upward thus to form a scraper portion 32 of the tip blade 17 extending transversely in contact with the surface of the belt 1, as shown in FIG. 12, when the bar 44 turns upward about the axis A in order to set the scraper 14 in its standing position. The axis A parallel to the bar 44 may be arranged to lie above the belt 1 as shown in FIG. 13 while, in FIG. 10, it extends beneath the belt 1. In the case shown in FIG. 13, the scraper 14 can be prevented from biting and scoring the belt 1 running in either the return R or forward F direction.

As best shown in FIG. 10, the bar 44 extending outwardly through the supporting plate 41 on the support 2 has at the terminal end thereof an actuator 47 fitted thereonto by a fixing means 48 such as a set bolt. The actuator 47 has an actuator arm 49 mounted thereto tangentially which in turn has a tensioning means 33. According to this embodiment, the tensioning means 33 is a plurality of leaf springs of three different length sized 50aa, 50b, and 50c which are arranged stepwise in a pile and fixedly secured to the distal end of the arm 49 by a fixing means 51 such as a combination of a bolt and a nut. The opposite end of the longest leaf springs 50a are held by a retaining member 52 attached detachably to the supporting plate 41. As shown in the drawings, the retaining member 52 is inserted into one of the retaining openings 53 spaced on an arc line about the axis A. The retaining member 52 can be either a U- or a J-shaped bolt. Accordingly, the bar 44 is urged for rotary displacement by the springs, the longest ones 50a of which are retained by the retaining member 52 inserted at an appropriate position into the opening 53, so that the scraper 14 can be turned upward to its standing position thus to allow the scraper portion 32 thereof to come in close contact with the surface of the belt 1 under pressure.

Another Embodiment for Scraper Construction

As best shown in FIG. 14, two of first and second scrapers 14aa, 14b are provided according to another embodiment. The second scraper 14b has at both ends support shafts 23a and 23b thereon respectively which are mounted for rotary displacement about a common axis thus to define the axis A extending transversely across the belt 1 to their respective supports 2 and 3 described in the first or second embodiment. The first scraper 14a is adjustably mounted by a pair of fixing means 23c and 23d, e.g. sets of a bolt and a nut, for rotary displacement to the second scraper 14b. That is, the bolts of the fixing means 23c and 23d are coaxially arranged along an axis Aa so that the first scraper 14a can be adjusted for upward displacement about the axis Aa. According to the embodiment, while a scraping portion 32b of the second scraper 14b is set in contact with the surface of the belt 1 by turning upwardly the second scraper 14b about the axis A, a scraping portion 32a of the first scraper 14a can also be placed in contact with the same by turning upwardly the first scraper 14a about the axis Aa. In the arrangement, while the belt 1 runs in the return direction R, the leavings on the belts 1 are particularly removed by double scraping action with the scraping portions 32a and 32b of the first and second scrapers 14aa, 14b, whereby the surface of the belt 1 will be cleaned.

FIG. 15 shows a combination of prior art belt cleaners and the scraper of the the present invention for double scraping action. The bar 44 has a plurality of known belt cleaners 54 thereon while the scraper 14 is supportedly mounted in the same manner as the second embodiment shown in FIG. 9 to the bar 44 extending in the transverse direction of the belt. The known belt cleaner 54 may have the same construction as the one, as depicted above, disclosed in U.S. Pat. No. 3,841,470. A device may also be used which shoots a jet of liquid, e.g. water, in order to clear remainings from the belt surface by jet pressure.

Further Embodiment for the Scraper

FIG. 16 shows a scraper 14 according to a further embodiment. The scraper 14 is a solid plate of material such as ceramics, metal, hard rubber, or the like which, in the same manner as the first or second embodiment, is formed into a bow shape and mounted for rotary displacement about the axis A extending in the transverse direction of the belt. The scraper 14 has no tip blade as compared to the one in the other embodiments but has at uppermost end a scraper portion 32 thereof.

Other Embodiments for the Tensioning Means

FIGS. 17 to 22 show some other embodiment for the tensioning means 33.

In one embodiment shown in FIG. 17, the rotatable bar 44 supporting the scraper 14 has an arm 55 thereon extending from the periphery thereof across the scraper 14. A lever 57 disposed above the bar 55 is mounted for swing movement on a pivot 56 and connected at one end by a connecting means 58 such as a coil spring with the terminal end of the arm 55. The lever 57 has at the other end thereof a weight 59 so that the arm 55 can be urged upwardly by the connecting means 58 when the lever 57 is yieldingly turned on a pivot in the counter-clockwise direction represented by the arrows in FIG. 17, whereby the scraper 14 will be turned upward thus to set its scraping portion 32 in contact with the surface of the belt under pressure. It is a good idea to provide a position adjusting means 60, e.g. a thread, so that the weight 59 can be adjusted for axial displacement on the lever 57 therealong.

In another embodiment shown in FIG. 18, the rotatable bar 44 supporting the scraper 14 has an arm 61 thereon. The arm 61 extending downward, in turn, has at lower end a coil spring 62 which urges the arm 61 thus to turn the bar 44 in the counter-clockwise direction. The spring 62 is accommodated within a holding cylinder 63 and biased by a pressing rod 64 threaded for forward and backward movement into a hodling base 65.

In a further embodiment shown in FIG. 19, the rotatable bar 44 supporting the scraper 14 has an arm 66 thereon inserted into an actuator chamber 67. within the chamber 67, an expandable bag 68 is placed on the arm 66 to receive a fluid of liquid from a pump 69. Accordingly, when the bag 68 expands upon being filled with the liquid, the arm 66 will be pressed downward thus to turn the bar 44 in the counter-clockwise direction. While the liquid in the bag 68 is under pressure from the pump 69, the bar 44 remains urged in the counter-clockwise direction.

In a further embodiment shown in FIG. 20, the supporting shaft 23b supporting the scraper 14 comprises two short shafts 23e and 23f and a tensioning member 70 of resilient material such as rubber by which the two shafts 23e, 23f are joined together. The shaft 23f on the outward end is adjustably mounted for rotary displacement to the support 3. Accordingly, when the scraper 14 is turned upward to its standing position on the support 3 by adjustingly displacing the shaft 23f, the scraping portion 32 thereof becomes in close contact with the belt surface under pressure as the tensioning member 70 remains twisted. This allows the scraper 14 to turn about the axis A, i.e. a center of the twist movement of the tensioning member 70, and also, to be constantly urged by the resilience of the tensioning member 70 to remain in close contact with the belt surface.

Embodiment Excluding the Tensioning Means

In an embodiment shown in FIG. 21, no tensioning means is provided in the cleaner of the present invention.

The rotatable bar 44 supporting the scraper 14 has a downwardly extending arm 71 thereon which is in turn connected for forward and backward displacement via a joint 72 to an adjusting member 73. the adjusting member, which may be a bolt screwed into a nut 75 fixedly mounted to a base 74, is adjustable for axially forward and backward displacement under the thread engagement. The joint 72 transfers the movement of the adjusting member 73 to the arm 71.

While the adjusting member 73 moves forward under the thread engagement, the bar 44 is turned in the counter-clockwise direction so that the scraping portion of the scraper 14 becomes in contact with the belt surface under pressure to remove the leavings from the belt surface by scraping. When there is a clearance between the scraper portion and the belt surface resulting from wear on the scraper portion, the adjusting member 73 can be moved for adjustment by screwing so that the scraper portion can be lifted upward to come in contact with the belt arcuate surface once more.

According to the present invention, since the arcuate scraping portion corresponds in shape with the belt surface of arcuate cross-sectional shape, there is no need to press down the scraping portion against the belt surface under intensive pressure. Therefore, the effective scraping action can be performed without use of a tensioning means, as depicted above in conjunction with FIG. 21.

OPERATION

In the cleaner for a conveyor belt according to the present invention, the scraper 14 is adjustably supported for rotary displacement about the axis A extending in the transverse direction of the belt and has the scraping portion 32 thereon which intends to be in contact with the belt surface and is outwardly deflected a maximum from the common axis A at a point midway between the side ends of the belt. Accordingly, when the scraper 14 is turned upward about the axis A to its standing position, the scraping portion 32 thereof will arch its central region as lifted upward. This allows the scraping portion 32 of the scraper 14 to remain in close contact with the belt surface without clearance even if either the belt 1 is trough-shaped in cross section or the lengthwisely extending central region of the belt surface gets worn, whereby the leavings on the belt surface will be scraped off in an optimum manner.

In addition, according to the belt cleaner of the invention, the scraper 14 is urged for rotary displacement to its standing position by the tensioning means 33 so that the scraping portion 32 thereof becomes in contact with the belt surface under pressure. This allow the scraper 14 to turn automatically to its standing position, when its scraping portion gets worn, and thus, the scraping portion 32 thereof will remain in close contact with the belt surface as being arcuately deflected upward. Thereby, the optimum scraping operation can be performed constantly without adjusting a standing position of the scraper 14.

While the scraper 14 is arranged to deflect arcuately in the return direction R of the running belt 1, during the scraping operation on the belt, a mass of scraped material scraped at both side ends of the scraper 14 tends to gather in the central region of the same as the belt runs forward and thus, will fall down into a hopper disposed beneath the belt.

In the embodiments depicted in conjunction with FIGS. 13 and 21, the scraper 14 is prevented from biting the belt surface upon being excessively turned to its standing position so as to rest in a specific position without turning. This allows the scraper 14 to be arranged to deflect arcuately in the opposite direction to the return direction R of the running belt 1.

It will be understood that the principles of the present invention are not limited to the embodiments set forth above and various modifications may be made without departing from the spirits and the scope of the invention.

We claim:

1. A cleaner for a conveyor belt having a scraper and holder means for holding said scraper, wherein said scraper and holder means have a lengthwise extent for spanning the width of the conveyor belt, said scraper and said holder means being adjustably supported for rotary displacement about an axis extending parallel to their lengthwise extent and being deflected in a transverse direction from said axis to form an arch-shaped curvature having an apex at a point midway between ends thereof, said scraper being detachably mounted to said holder means in a manner having a scraping portion projecting normal to said transverse direction.

2. A cleaner for a conveyor belt, as defined in claim 1, wherein said holder means has shaft members at each end thereof, said shaft members being mounted for rotary displacement about a common axis to supports so as to define the axis for rotary displacement of the scraper.

3. A cleaner for a conveyor belt, as defined in claim 2, wherein said shaft members are a pair of coaxially disposed shafts, a common axis of which coincides with the rotational axis of the scraper.

4. A cleaner for a conveyor belt having a scraper and holder means for holding said scraper, wherein said scraper and holder means have a lengthwise extent for spanning the width of the conveyor belt, said holder means being urged for rotary displacement about an axis extending parallel to their lengthwise extent by a tensioning means to a standing position, whereby said holder means are deflected in a transverse direction from said axis to form an arch shape having an apex at a point midway between ends thereof, said scraper being arch shaped in the same manner as said holder means and being detachably mounted to said holder means in a manner having a scraping portion projecting from said holder means normal to said transverse direction for causing aid scraping portion to contact a conveyor belt surface when said holder means rotates about said axis as a result of rotational pressure exerted by the tensioning means.

5. A cleaner for a conveyor belt, as defined in claim 4, wherein said holder means has shaft members at each end thereof, said shaft members being mounted for rotary displacement about a common axis to supports so as to define the axis for rotary displacement of the scraper.

6. A cleaner for a conveyor belt, as defined in claim 5, wherein said shaft members are a pair of coaxially disposed shafts, a common axis of which coincides with the rotational axis of the scraper.

7. A cleaner for a conveyor belt as defined in claim 3, wherein the scraper includes a back surface and an upper edge, wherein a tip member of wear-resistant material is mounted on said back surface of said upper edge, and a resilient sheet member is attached to the back surface beneath the tip member so as to hang downward to cover the back surface of the scraper and holder means.

8. A cleaner for a conveyor belt as defined in claim 4, wherein the scraper includes a back surface and an upper edge, wherein a tip member of wear-resistant material is mounted on said back surface of said upper edge, and a resilient sheet member is attached to the back surface beneath the tip member so as to hang downward to cover the back surface of the scraper and holder means.

9. A cleaner for a conveyor belt having a scraper and holder means for holding said scraper, wherein said scraper and holder means have a lengthwise extent for spanning the width of the conveyor belt, said holder means being adjustably supported for rotary displacement about an axis extending parallel to their lengthwise extent, wherein said holder means comprises a channel member, said channel member being deflected from said axis in a transverse direction to form an arch shape having an apex at a point midway between ends thereof, wherein elongated portions are located on the channel member at opposite ends thereof, said elongated portions extending in a direction opposite said deflection and having coaxially disposed shaft members that form said axis, and wherein said scraper is detachably inserted in said channel member in a manner having a scraping portion thereof projecting normal to said transverse direction, said scraping portion being operable for contacting a conveyor belt surface when said holder means rotates about said axis.

10. A cleaner for a conveyor belt as defined in claim 9, wherein the scraper includes a back surface and an upper edge, wherein a tip member of wear-resistant material is mounted on said back surface of said upper edge, and a resilient sheet member is attached to the back surface beneath the tip member so as to hang downward to cover the back surface of the scraper and holder means.

11. A cleaner for a conveyor belt, as defined in claim 9, wherein the holder means comprises a bottom wall and rail-like parallel holding walls extending upwardly from aid bottom wall to form said channel member, said bottom and holding walls having end portions which form the elongated portions to which said shaft members are fixedly mounted.

* * * * *